(12) United States Patent
Fredette

(10) Patent No.: US 12,709,209 B1
(45) Date of Patent: Aug. 18, 2026

(54) HITCH-ATTACHED TRUCK BED RAMP

(71) Applicant: Daniel Fredette, Hamner (CA)

(72) Inventor: Daniel Fredette, Hamner (CA)

( * ) Notice: Subject to any disclaimer, the term of this patent is extended or adjusted under 35 U.S.C. 154(b) by 735 days.

(21) Appl. No.: 18/115,048

(22) Filed: Feb. 28, 2023

(51) Int. Cl.
*B60P 1/43* (2006.01)
*B60P 3/07* (2006.01)
*B65G 69/30* (2006.01)

(52) U.S. Cl.
CPC .................. *B60P 1/43* (2013.01); *B60P 3/07* (2013.01); *B65G 69/30* (2013.01)

(58) Field of Classification Search
CPC ............... B65G 69/30; B60P 1/43; B60P 3/07
See application file for complete search history.

(56) References Cited

U.S. PATENT DOCUMENTS 5,699,985 A * 12/1997 Vogel ....................... B60R 9/06 224/521
6,176,672 B1 1/2001 Egan
D505,238 S 5/2005 Robertson
7,455,489 B1 11/2008 Klev
8,061,754 B1 * 11/2011 Webb ...................... B60P 3/122 296/61
8,668,427 B1 * 3/2014 England .................... B60P 1/43 414/537
8,894,345 B1 11/2014 Richins
9,670,013 B2 * 6/2017 Parrish .................... B60P 1/435
9,738,203 B2 * 8/2017 Michaud ................ B60P 1/431
9,745,153 B2 8/2017 Pelzer
2008/0159838 A1 * 7/2008 Sherer ..................... B60P 1/435 414/537
2008/0292438 A1 * 11/2008 Patterson ............... B60P 1/435 414/537
2013/0045069 A1 * 2/2013 Day .......................... B60P 1/43 414/812
2014/0338137 A1 11/2014 Stokes

* cited by examiner

*Primary Examiner* — Gary S Hartmann

(57) ABSTRACT

The truck bed ramp is a mechanical structure. The truck bed ramp is configured for use in transporting a vehicle. The truck bed ramp incorporates an openwork platform structure, a receiver structure, a plurality of wheel ramps, and a pickup truck. The openwork platform structure, the receiver structure, and the plurality of wheel ramps are contained in the pickup truck. The receiver structure attaches to the openwork platform structure. The plurality of wheel ramps attach to the openwork platform structure. The receiver structure secures the openwork platform structure to a hitch of the pickup truck. The plurality of wheel ramps load the vehicle into a bed of the pickup truck.

10 Claims, 10 Drawing Sheets

102
121
122
123
115
114

101
102
103

HITCH-ATTACHED TRUCK BED RAMP

CROSS REFERENCES TO RELATED APPLICATIONS

Not Applicable

STATEMENT REGARDING FEDERALLY SPONSORED RESEARCH

Not Applicable

REFERENCE TO APPENDIX

Not Applicable

BACKGROUND OF THE INVENTION

Field of the Invention

The present invention relates to the field of objects for carrying vehicles. (B60P3/07)

SUMMARY OF INVENTION

The truck bed ramp is a mechanical structure. The truck bed ramp is configured for use in transporting a vehicle (such as an all-terrain vehicle). The truck bed ramp comprises an openwork platform structure, a receiver structure, a plurality of wheel ramps, and a pickup truck. The openwork platform structure, the receiver structure, and the plurality of wheel ramps are contained in the pickup truck. The receiver structure attaches to the openwork platform structure. The plurality of wheel ramps attach to the openwork platform structure. The pickup truck further comprises a bed and a hitch. The receiver structure secures the openwork platform structure to the hitch of the pickup truck. The plurality of wheel ramps load the vehicle into the bed of the pickup truck.

These together with additional objects, features and advantages of the truck bed ramp will be readily apparent to those of ordinary skill in the art upon reading the following detailed description of the presently preferred, but nonetheless illustrative, embodiments when taken in conjunction with the accompanying drawings.

In this respect, before explaining the current embodiments of the truck bed ramp in detail, it is to be understood that the truck bed ramp is not limited in its applications to the details of construction and arrangements of the components set forth in the following description or illustration. Those skilled in the art will appreciate that the concept of this disclosure may be readily utilized as a basis for the design of other structures, methods, and systems for carrying out the several purposes of the truck bed ramp.

It is therefore important that the claims be regarded as including such equivalent construction insofar as they do not depart from the spirit and scope of the truck bed ramp. It is also to be understood that the phraseology and terminology employed herein are for purposes of description and should not be regarded as limiting.

BRIEF DESCRIPTION OF DRAWINGS

The accompanying drawings, which are included to provide a further understanding of the invention are incorporated in and constitute a part of this specification, illustrate an embodiment of the invention and together with the description serve to explain the principles of the invention. They are meant to be exemplary illustrations provided to enable persons skilled in the art to practice the disclosure and are not intended to limit the scope of the appended claims.

DETAILED DESCRIPTION OF THE EMBODIMENT

The following detailed description is merely exemplary in nature and is not intended to limit the described embodiments of the application and uses of the described embodiments. As used herein, the word “exemplary” or “illustrative” means “serving as an example, instance, or illustration.” Any implementation described herein as “exemplary” or “illustrative” is not necessarily to be construed as preferred or advantageous over other implementations. All of the implementations described below are exemplary implementations provided to enable persons skilled in the art to practice the disclosure and are not intended to limit the scope of the appended claims. Furthermore, there is no intention to be bound by any expressed or implied theory presented in the preceding technical field, background, brief summary or the following detailed description.

Figure 1:
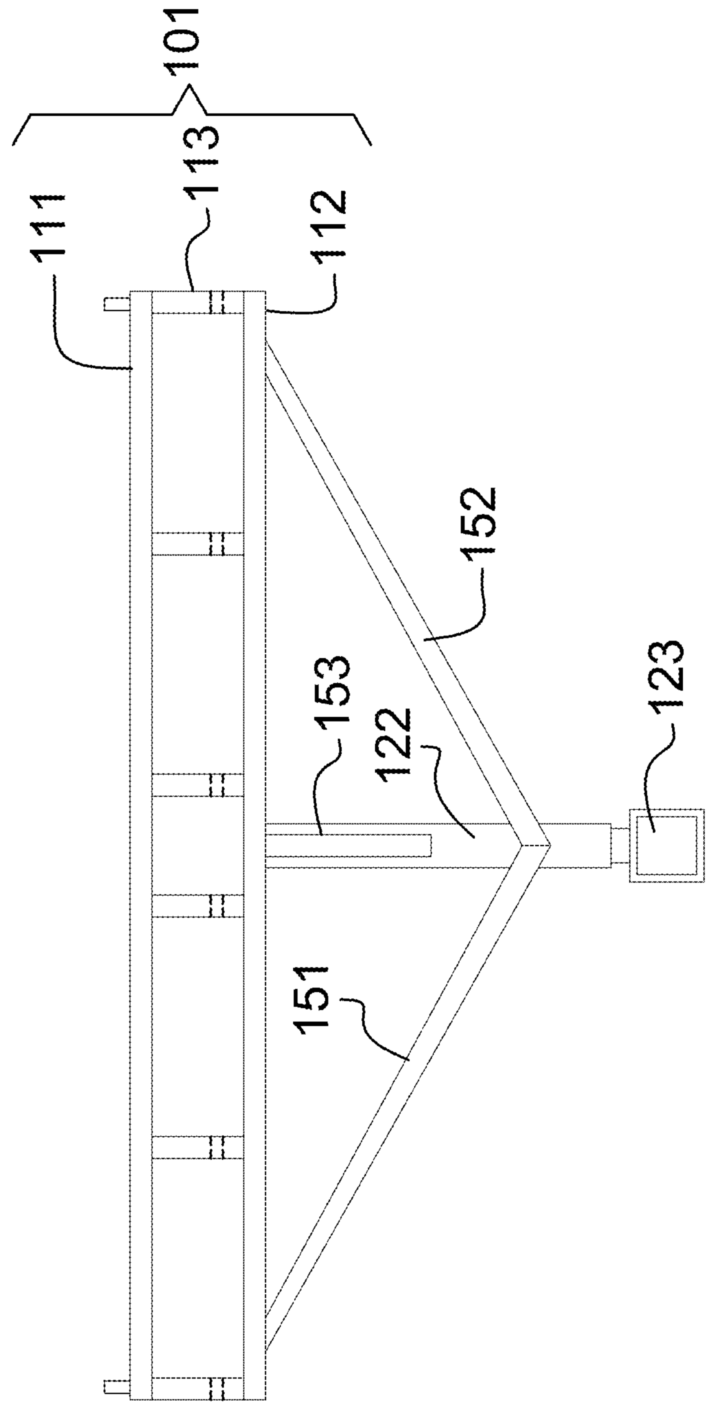
FIG. 1 is a posterior view of an embodiment of the disclosure.
Figure 2:
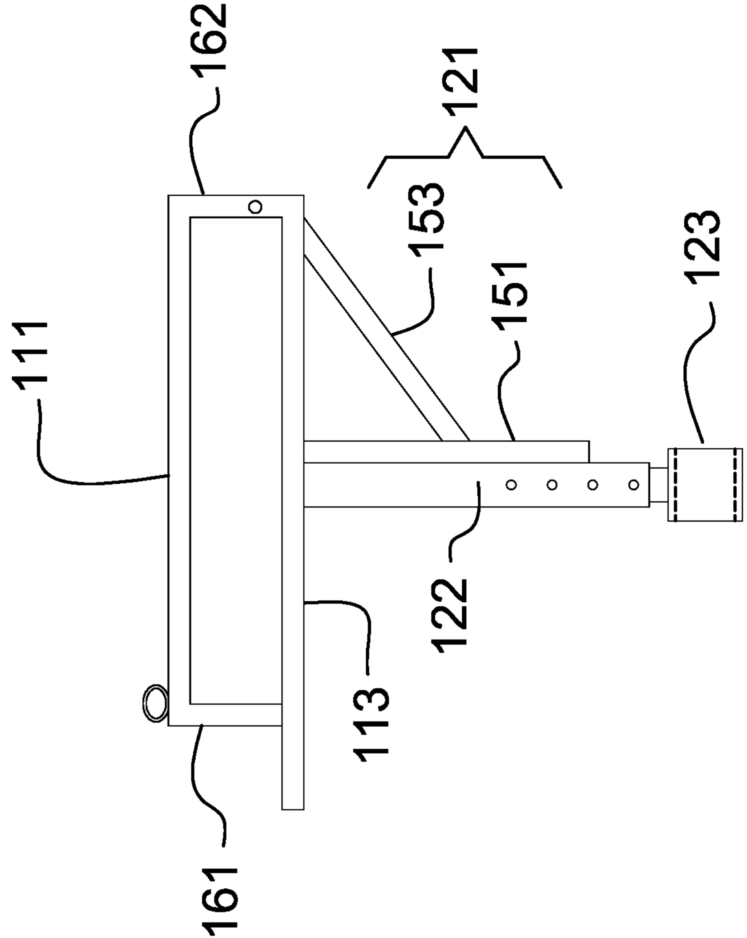
FIG. 2 is a left side view of an embodiment of the disclosure.
Figure 3:
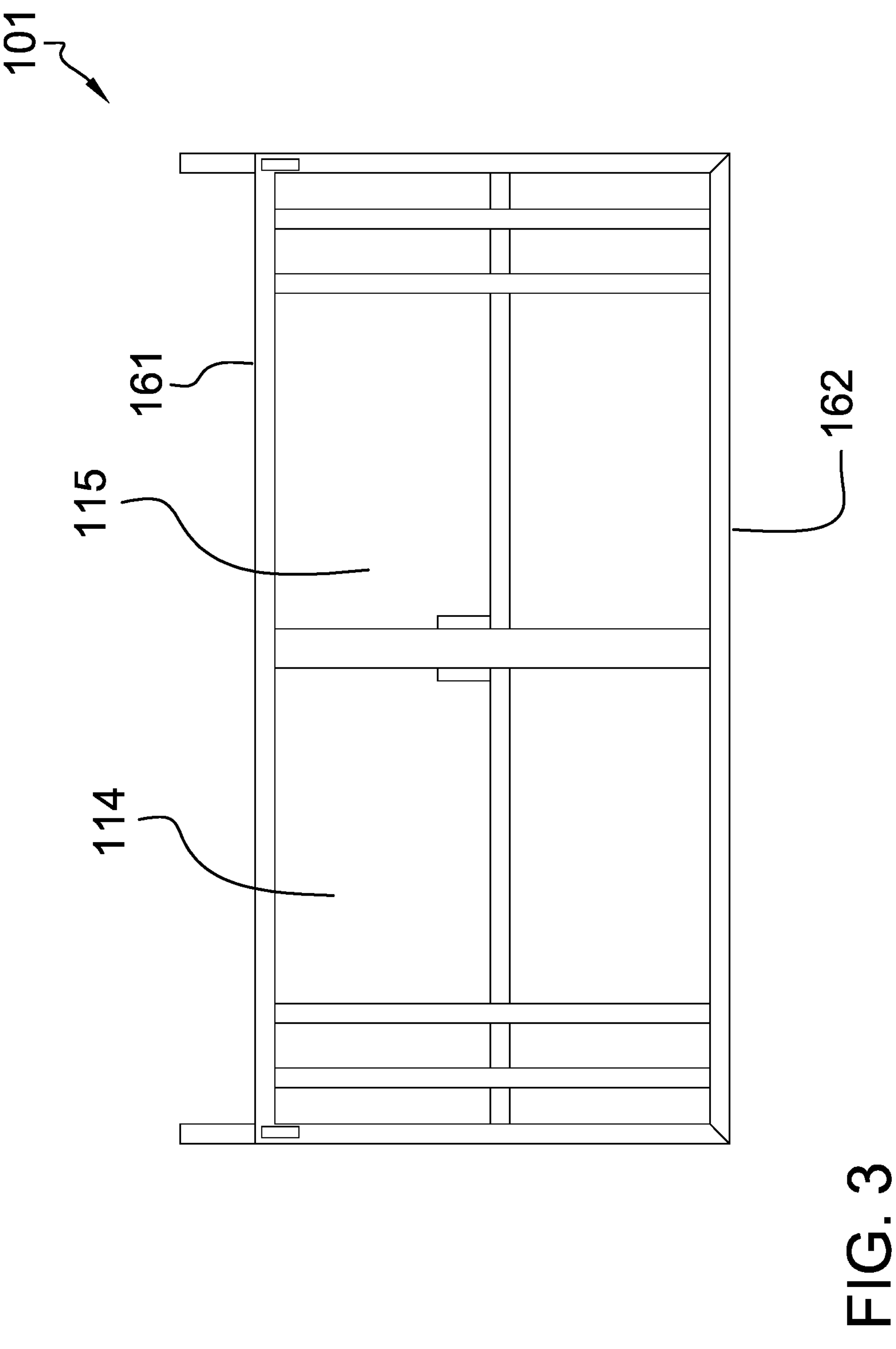
FIG. 3 is a top view of an embodiment of the disclosure.
Figure 4:
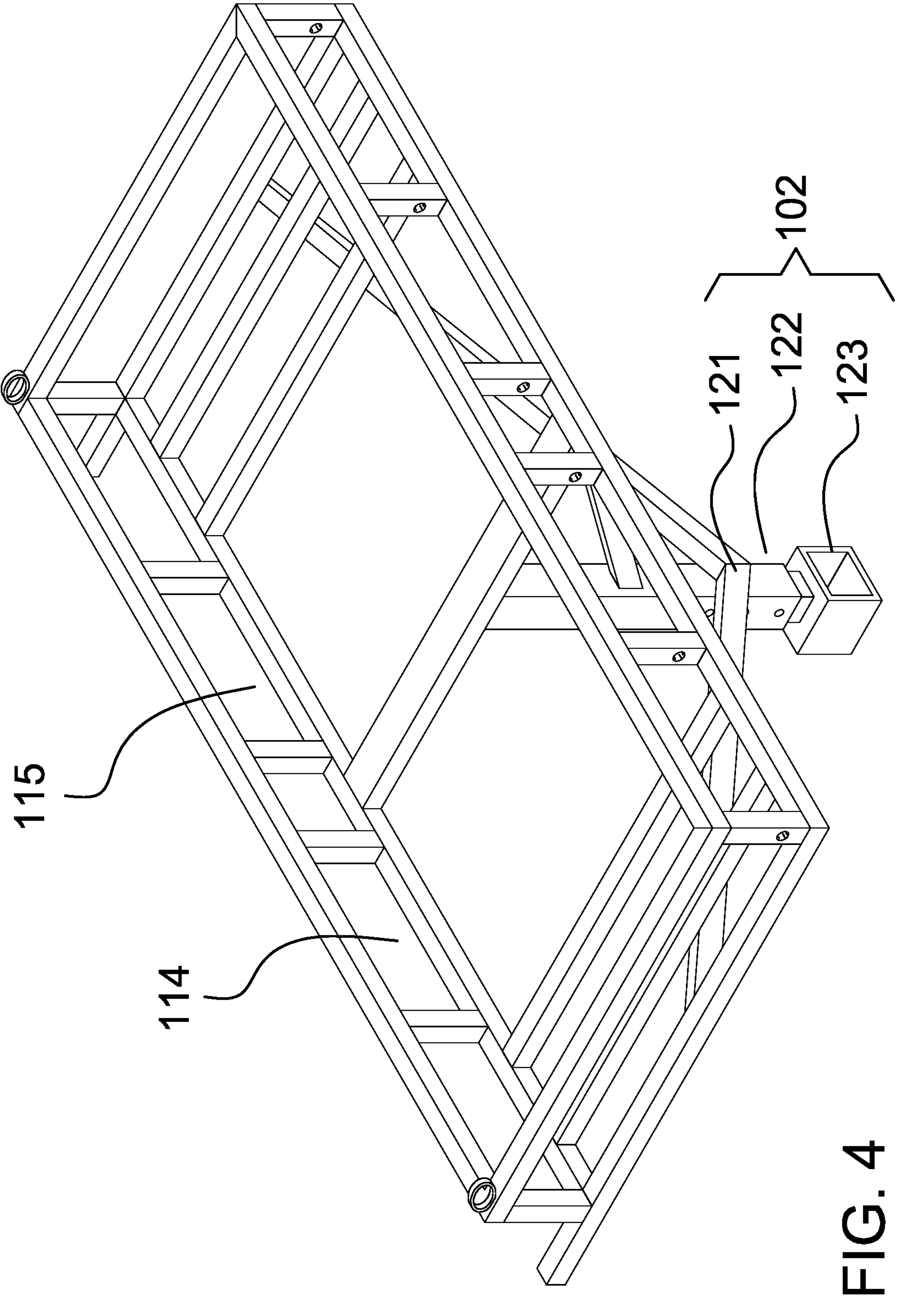
FIG. 4 is a perspective view of an embodiment of the disclosure.
Figure 5:
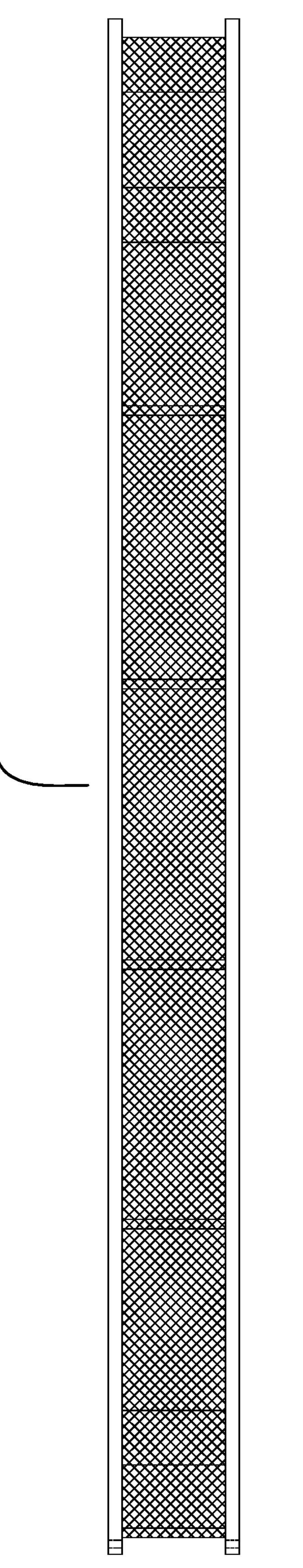
FIG. 5 is a detail view of an embodiment of the disclosure.
Figures 6, 7:
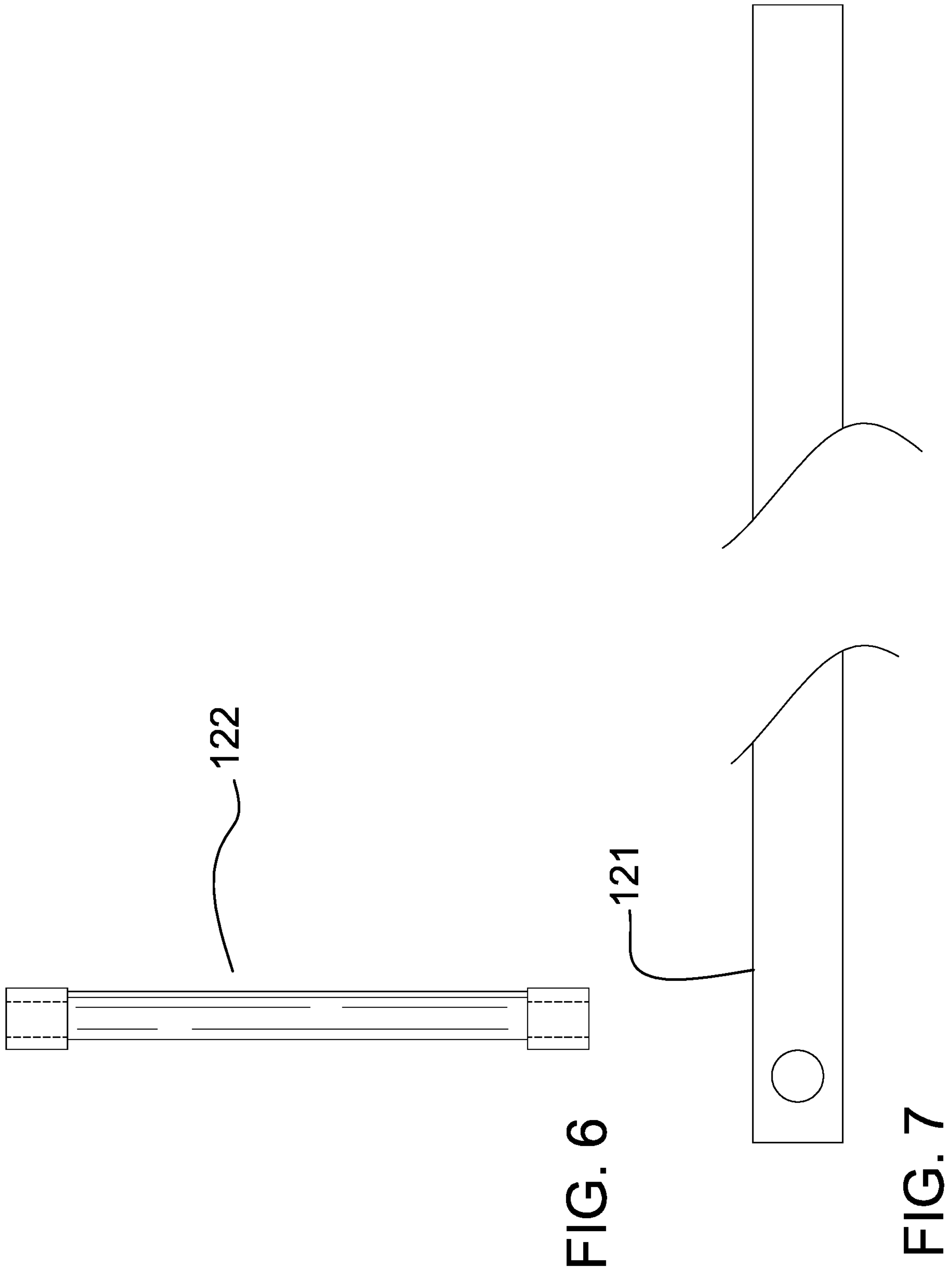
FIG. 6 is a detail view of an embodiment of the disclosure.
FIG. 7 is a detail view of an embodiment of the disclosure.
Figure 8:
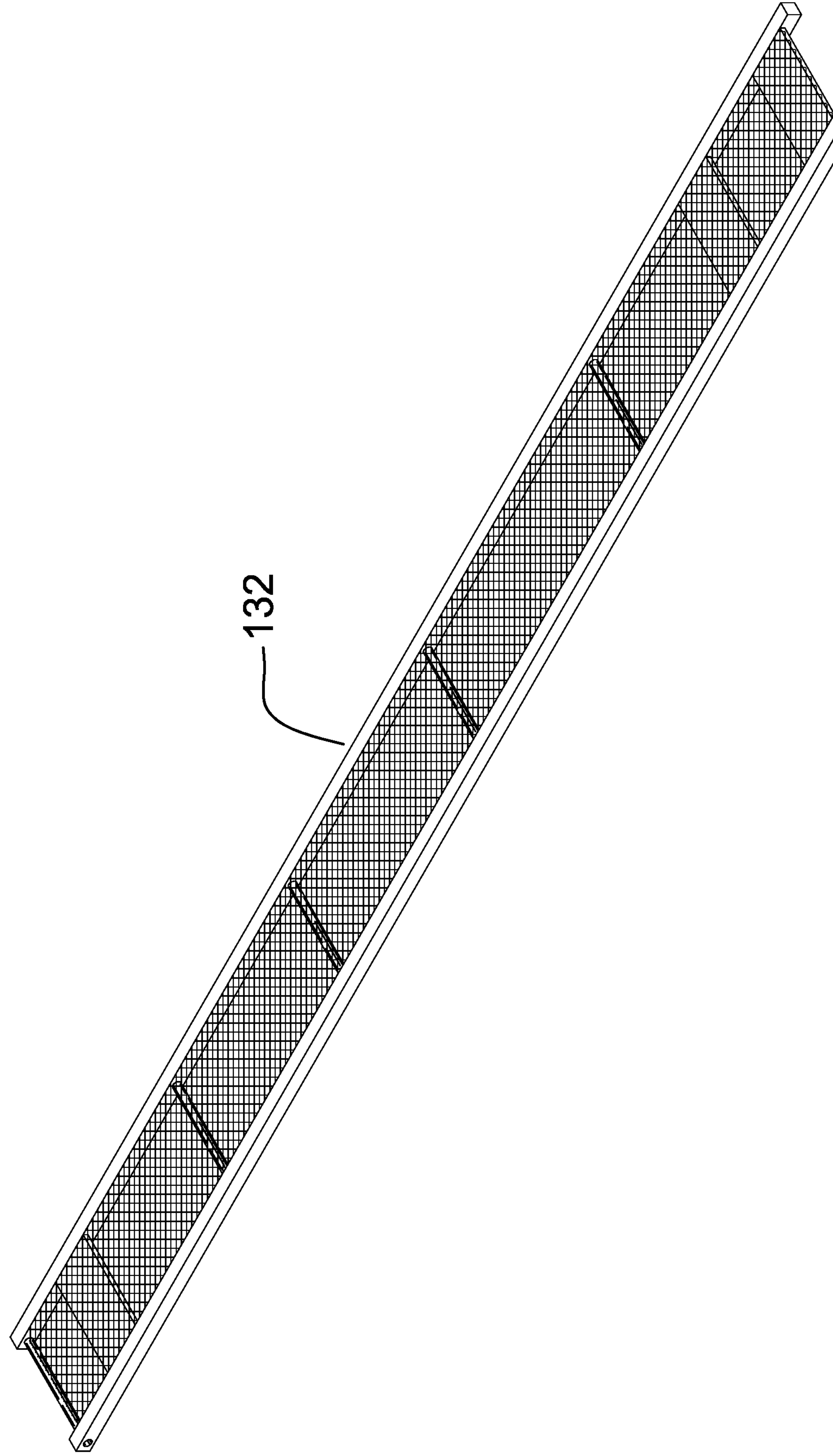
FIG. 8 is a detail view of an embodiment of the disclosure.
Figure 9:
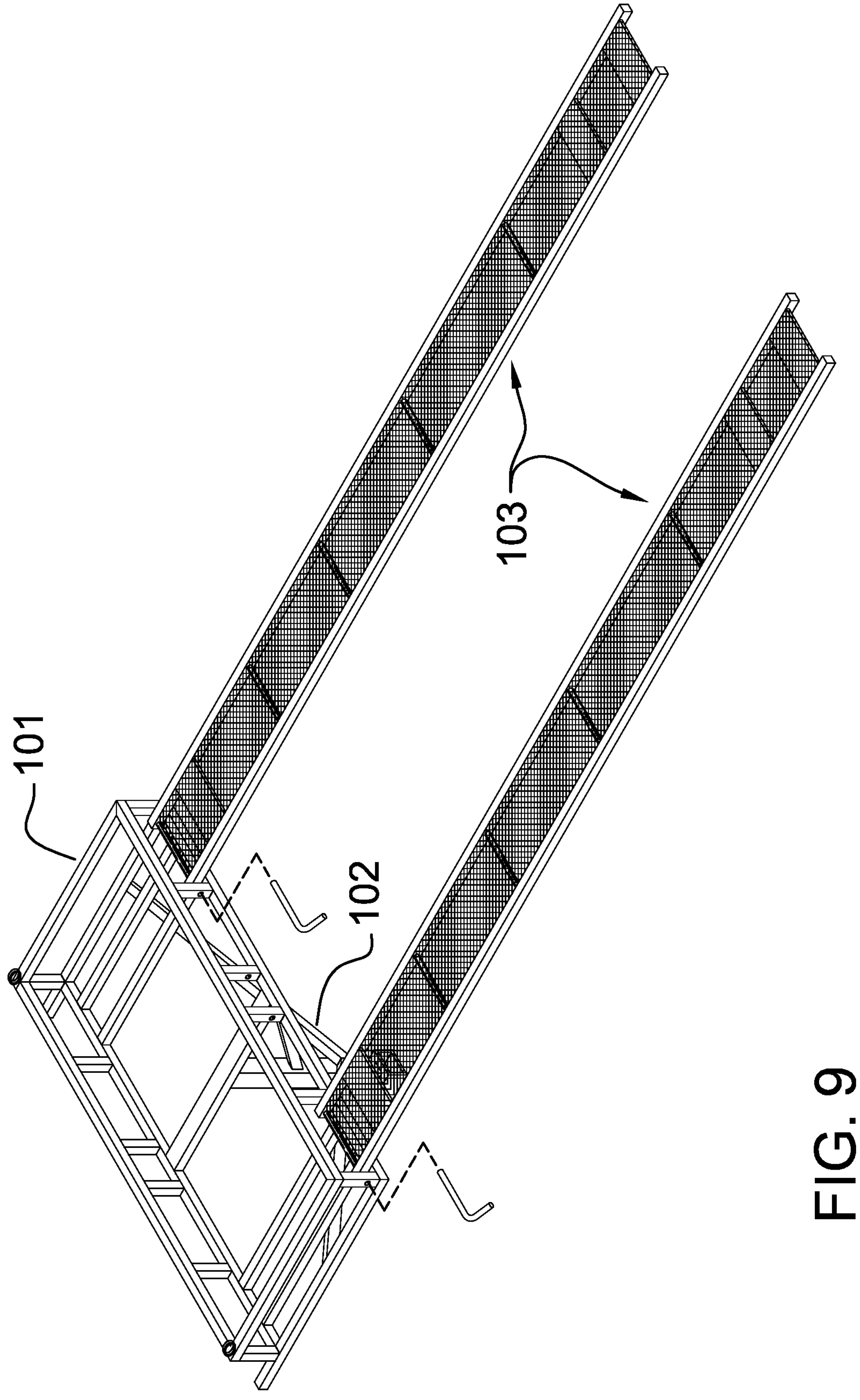
FIG. 9 is a detail view of an embodiment of the disclosure.
Figure 10:
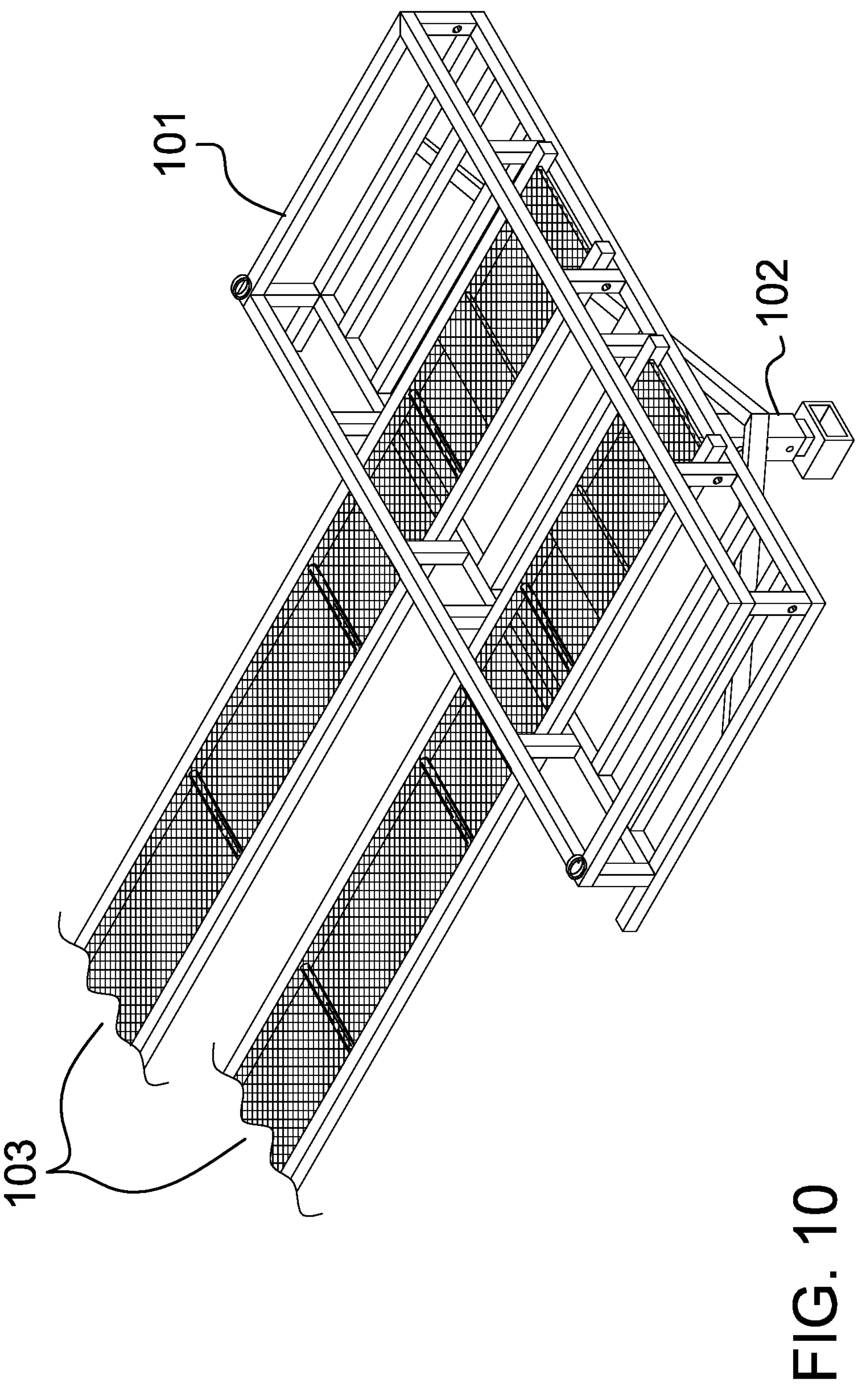
FIG. 10 is an in-use view of an embodiment of the disclosure.
Figure 11:
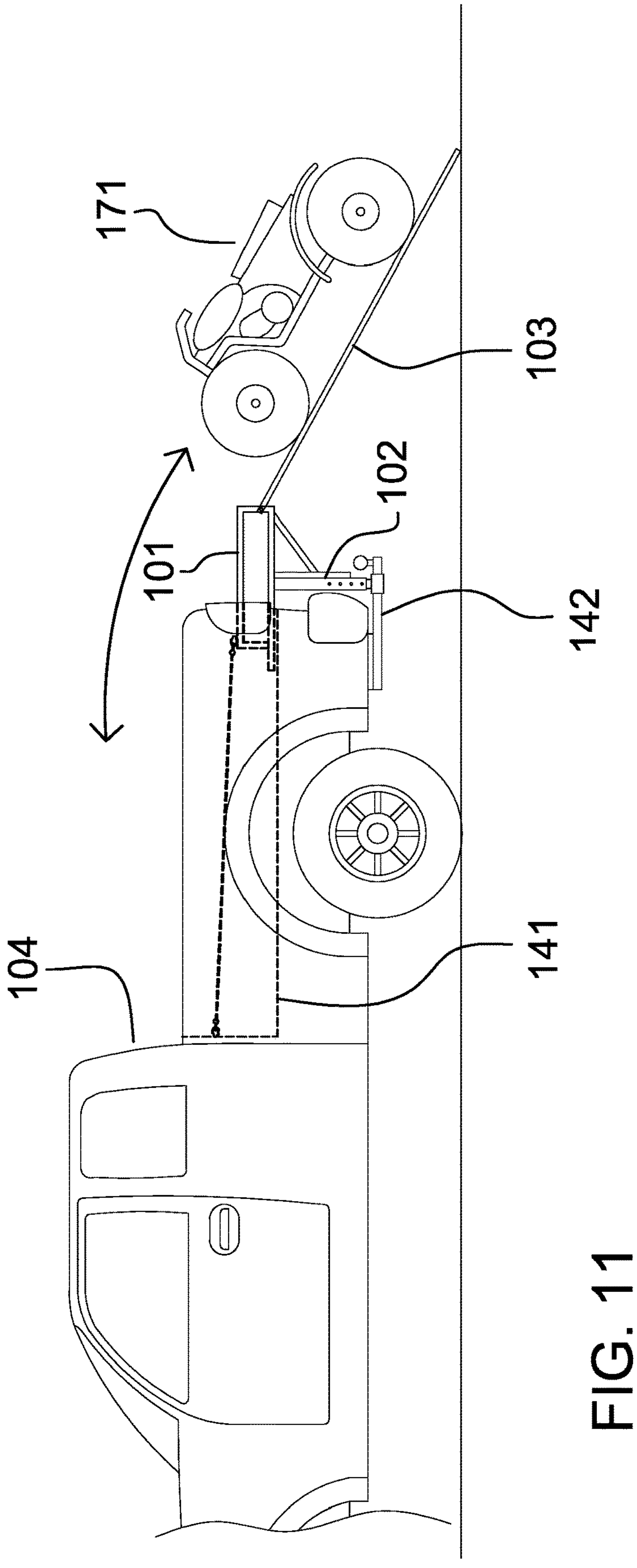
FIG. 11 is an in-use view of an embodiment of the disclosure.

Detailed reference will now be made to one or more potential embodiments of the disclosure, which are illustrated in FIGS. 1 through 11.

The truck bed ramp 100 (hereinafter invention) is a mechanical structure. The invention 100 is configured for use in transporting a vehicle (such as an all-terrain vehicle). The invention 100 comprises an openwork platform structure 101, a receiver structure 102, a plurality of wheel ramps 103, and a pickup truck 104. The openwork platform structure 101, the receiver structure 102, and the plurality of wheel ramps 103 are contained in the pickup truck 104. The receiver structure 102 attaches to the openwork platform structure 101. The plurality of wheel ramps 103 attach to the openwork platform structure 101. The pickup truck 104 further comprises a bed 141 and a hitch 142. The receiver structure 102 secures the openwork platform structure 101 to the hitch 142 of the pickup truck 104. The plurality of wheel ramps 103 load the vehicle into the bed 141 of the pickup truck 104.

The pickup truck 104 is a motorized vehicle. The pickup truck 104 is configured for use in transporting cargo. The pickup truck 104 is defined elsewhere in this disclosure. The bed 141 is defined elsewhere in this disclosure. The hitch 142 is defined elsewhere in this disclosure.

The openwork platform structure 101 is a prism shaped structure. The openwork platform structure 101 is an openwork structure. The openwork platform structure 101 is a rigid structure. The openwork platform structure 101 is a load bearing structure. The openwork platform structure 101 rests on the superior surface of the bed 141 of the pickup truck 104. The openwork platform structure 101 forms a platform that elevates the vehicle 171 above the bed 141 of the pickup truck 104. The openwork platform structure 101 transfers the load of the vehicle 171 to the bed 141. The openwork platform structure 101 comprises a superior face 111, an inferior face 112, a plurality of lateral faces 113, a left side ramp channel 114, and a right side ramp channel 115.

The superior face 111 is a congruent end of the prism structure of the openwork platform structure 101. The superior face 111 forms the superior surface of the openwork platform structure 101. The superior face 111 is a rigid structure. The superior face 111 is a load bearing structure. The superior face 111 forms the supporting surface that elevates the vehicle 171 above the bed 141 of the pickup truck 104. The superior face 111 receives the load of the vehicle 171. The superior face 111 transfers the load of the vehicle 171 to the plurality of lateral faces 113.

The inferior face 112 is a congruent end of the prism structure of the openwork platform structure 101. The inferior face 112 forms the inferior surface of the openwork platform structure 101. The inferior face 112 is a rigid structure. The inferior face 112 is a load bearing structure. The inferior face 112 is the face of the openwork platform structure 101 that is distal from the superior face 111. The inferior face 112 forms the congruent end of the prism structure of the openwork platform structure 101 that rests on the superior surface of the bed 141 of the pickup truck 104. The inferior face 112 receives the loads of the superior face 111 and the vehicle 171 from the plurality of lateral faces 113. The inferior face 112 forms a pedestal that transfers the loads of the vehicle 171 and the openwork platform structure 101 to the bed 141 of the pickup truck 104.

The plurality of lateral faces 113 form the lateral face structure of the prism structure of the openwork platform structure 101. The plurality of lateral faces 113 form the vertically oriented load bearing structures of the openwork platform structure 101. The plurality of lateral faces 113 transfers the loads of the superior face 111 and the vehicle 171 to the inferior face 112. The plurality of lateral faces 113 form the extension structure that elevates the superior face 111 above the bed 141 of the pickup truck 104. The plurality of lateral faces 113 comprises an anterior lateral face 161, and a posterior lateral face 162.

The anterior lateral face 161 is a lateral face selected from the plurality of lateral faces 113 of the openwork platform structure 101. The surface of the anterior lateral face 161 is perpendicular to the primary sense of direction of the pickup truck 104. The anterior lateral face 161 is the lateral face of the prism structure of the openwork platform structure 101 that is proximal to the front of the pickup truck 104.

The posterior lateral face 162 is a lateral face selected from the plurality of lateral faces 113 of the openwork platform structure 101. The surface of the posterior lateral face 162 is perpendicular to the primary sense of direction of the pickup truck 104. The posterior lateral face 162 is the lateral face of the prism structure of the openwork platform structure 101 that is proximal to the rear of the pickup truck 104. The posterior lateral face 162 is the face of the openwork platform structure 101 that is distal from the anterior lateral face 161.

The left side ramp channel 114 comprises a first plurality of aligned negative spaces that are formed through the anterior lateral face 161 and the posterior lateral face 162 of the openwork platform structure 101. The left side ramp channel 114 forms a channel that allows the left side wheel ramp 131 to insert through the openwork platform structure 101 for storage. The right side ramp channel 115 comprises a second plurality of aligned negative spaces that are formed through the anterior lateral face 161 and the posterior lateral face 162 of the openwork platform structure 101. The right side ramp channel 115 forms a channel that allows the right side wheel ramp 132 to insert through the openwork platform structure 101 for storage. The left side wheel ramp 131 and the right side wheel ramp 132 are described elsewhere in this disclosure.

The receiver structure 102 is a fastening device. The receiver structure 102 is a rigid structure. The receiver structure 102 is a load bearing structure. The receiver structure 102 removably attaches to the openwork platform structure 101. The receiver structure 102 removably attaches the openwork platform structure 101 to the hitch 142 of the pickup truck 104. The receiver structure 102 holds the openwork platform structure 101 into a fixed position relative to the bed 141 of the pickup truck 104. The receiver structure 102 forms a brace structure that distributes transient forces between the openwork platform structure 101 and the pickup truck 104. The receiver structure 102 comprises a receiver stanchion 122, a receiver mount 123, and a plurality of receiver braces 121.

The receiver stanchion 122 is a prism shaped structure. The receiver stanchion 122 is a rigid structure. The receiver stanchion 122 is a load bearing structure. The receiver stanchion 122 is a vertically oriented structure. The receiver stanchion 122 forms an extension structure that bridges the reach between the inferior face 112 of the openwork platform structure 101 and the hitch 142 of the pickup truck 104. The receiver stanchion 122 forms a bracing structure that distributes transient forces between the inferior face 112 and the receiver mount 123.

The receiver mount 123 is a mechanical structure. The receiver mount 123 attaches to the congruent end of the prism structure of the receiver stanchion 122 that is distal from the inferior face 112 of the openwork platform structure 101. The receiver mount 123 is a fastening device. The receiver mount 123 removably attaches to the hitch 142 of the pickup truck 104. The receiver mount 123 secures the receiver stanchion 122 to the hitch 142.

Each receiver brace selected from the plurality of receiver braces 121 is a prism shape structure. Each receiver brace selected from the plurality of receiver braces 121 is a rigid structure. Each receiver brace selected from the plurality of receiver braces 121 forms a load bearing gusset. Each receiver brace selected from the plurality of receiver braces 121 attaches the receiver stanchion 122 to the inferior face 112 of the openwork platform structure 101. The plurality of receiver braces 121 combine to form a bracing structure that distributes transient forces between the receiver stanchion 122 and the inferior face 112 of the openwork platform structure 101. The plurality of receiver braces 121 further comprises a first receiver brace 151, a second receiver brace 152, and a third receiver brace 153.

The first receiver brace 151 is a prism shape structure. The first receiver brace 151 is a rigid structure The first receiver brace 151 attaches the receiver stanchion 122 to the inferior face 112 of the openwork platform structure 101. The first receiver brace 151 forms a gusset that projects away from the receiver stanchion 122 towards the left side of the pickup truck 104.

The second receiver brace 152 is a prism shape structure. The second receiver brace 152 is a rigid structure. The second receiver brace 152 attaches the receiver stanchion 122 to the inferior face 112 of the openwork platform structure 101. The second receiver brace 152 forms a gusset that projects away from the receiver stanchion 122 towards the right side of the pickup truck 104.

The third receiver brace 153 is a prism shape structure. The third receiver brace 153 is a rigid structure. The third receiver brace 153 attaches the receiver stanchion 122 to the inferior face 112 of the openwork platform structure 101. The third receiver brace 153 forms a gusset that projects away from the receiver stanchion 122. The center axis of the prism structure of the third receiver brace 153 aligns with the primary sense of direction of the pickup truck 104.

Each wheel ramp selected from the plurality of wheel ramps 103 is a rigid structure. Each selected wheel ramp is a disk shaped structure. Each selected wheel ramp is a load bearing structure. Any first wheel ramp selected from the plurality of wheel ramps 103 is essentially geometrically identical to any second wheel ramp selected from the plurality of wheel ramps 103. Each wheel ramp selected from the plurality of wheel ramps 103 forms a ramp. The ramps formed by the plurality of wheel ramps 103 allows the vehicle 171 to be rolled from the ground onto the superior face 111 of the openwork platform structure 101. The plurality of wheel ramps 103 comprises a left side wheel ramp 131 and a right side wheel ramp 132.

The left side wheel ramp 131 is a rigid structure. The left side wheel ramp 131 is a disk shaped structure. The left side wheel ramp 131 is a load bearing structure. The left side wheel ramp 131 forms a ramp. The left side wheel ramp 131 allows the wheels on the left side of the vehicle 171 to be rolled from the ground onto the superior face 111 of the openwork platform structure 101.

The right side wheel ramp 132 is a rigid structure. The right side wheel ramp 132 is a disk shaped structure. The right side wheel ramp 132 is a load bearing structure. The right side wheel ramp 132 forms a ramp. The right side wheel ramp 132 allows the wheels on the right side of the vehicle 171 to be rolled from the ground onto the superior face 111 of the openwork platform structure 101.

The following definitions were used in this disclosure:

Align: As used in this disclosure, align refers to an arrangement of objects that are: 1) arranged in a straight plane or line; 2) arranged to give a directional sense of a plurality of parallel planes or lines; or, 3) a first line or curve is congruent to and overlaid on a second line or curve.

Anterior: As used in this disclosure, anterior is a term that is used to refer to the front side or direction of a structure. When comparing two objects, the anterior object is the object that is closer to the front of the structure.

Beam: As used in this disclosure, a beam is a horizontally oriented load bearing structure.

Bed: As used in this disclosure, a bed refers to a horizontally oriented surface that forms the supporting surface for a load.

Brace: As used in this disclosure, a brace is a rigid structural element that interconnects a first object with a second object to form a resulting object. The brace forms an energy transfer structure that transfers, distributes, and shares a force acting on the first object between the first object and the second object. The brace is used to support, stabilize, or otherwise steady an object.

Cant: As used in this disclosure, a cant is an angular deviation from one or more reference lines (or planes) such as a vertical line (or plane) or a horizontal line (or plane).

Center: As used in this disclosure, a center is a point that is: 1) the point within a circle that is equidistant from all the points of the circumference; 2) the point within a regular polygon that is equidistant from all the vertices of the regular polygon; 3) the point on a line that is equidistant from the ends of the line; 4) the point, pivot, or axis around which something revolves; or, 5) the centroid or first moment of an area or structure. In cases where the appropriate definition or definitions are not obvious, the fifth option should be used in interpreting the specification.

Center Axis: As used in this disclosure, the center axis is the axis of a cylinder or a prism. The center axis of a prism is the line that joins the center point of the first congruent face of the prism to the center point of the second corresponding congruent face of the prism. The center axis of a pyramid refers to a line formed through the apex of the pyramid that is perpendicular to the base of the pyramid. When the center axes of two cylinder, prism or pyramidal structures share the same line they are said to be aligned. When the center axes of two cylinder, prism or pyramidal structures do not share the same line they are said to be offset.

Composite Prism: As used in this disclosure, a composite prism refers to a structure that is formed from a plurality of structures selected from the group consisting of a prism structure and a pyramid structure. The plurality of selected structures may or may not be truncated. The plurality of prism structures are joined together such that the center axes of each of the plurality of structures are aligned. The congruent ends of any two structures selected from the group consisting of a prism structure and a pyramid structure need not be geometrically similar.

Congruent: As used in this disclosure, congruent is a term that compares a first object to a second object. Specifically, two objects are said to be congruent when: 1) they are geometrically similar; and, 2) the first object can superimpose over the second object such that the first object aligns, within manufacturing tolerances, with the second object.

Correspond: As used in this disclosure, the term correspond is used as a comparison between two or more objects wherein one or more properties shared by the two or more objects match, agree, or align within acceptable manufacturing tolerances.

Disk: As used in this disclosure, a disk is a prism-shaped object that is flat in appearance. The disk is formed from two congruent ends that are attached by a lateral face. The sum of the surface areas of two congruent ends of the prism-shaped object that forms the disk is greater than the surface area of the lateral face of the prism-shaped object that forms the disk. In this disclosure, the congruent ends of the prism-shaped structure that forms the disk are referred to as the faces of the disk.

Elevation: As used in this disclosure, elevation refers to the span of the distance in the superior direction between a specified horizontal surface and a reference horizontal surface. Unless the context of the disclosure suggest otherwise, the specified horizontal surface is the supporting surface the potential embodiment of the disclosure rests on. The infinitive form of elevation is to elevate.

Extension Structure: As used in this disclosure, an extension structure is an inert physical structure that is used to extend or bridge the reach between any two objects.

Exterior: As used in this disclosure, the exterior is used as a relational term that implies that an object is not contained within the boundary of a structure or a space.

Form Factor: As used in this disclosure, the term form factor refers to the size and shape of an object.

Geometrically Similar: As used in this disclosure, geometrically similar is a term that compares a first object to a second object wherein: 1) the sides of the first object have a one to one correspondence to the sides of the second object; 2) wherein the ratio of the length of each pair of corresponding sides are equal; 3) the angles formed by the first object have a one to one correspondence to the angles of the second object; and, 4) wherein the corresponding angles are equal. The term geometrically identical refers to a situation where the ratio of the length of each pair of corresponding sides equals 1. By the term essentially geometrically similar is meant that the primary shapes of two objects are geometrically similar except that there are functional items (such as fastening devices) associated with the primary shape may not maintain the ratio for geometric similarity. By the term roughly geometrically similar is meant that the form factors between the primary shape of the two objects can vary by a factor of up to 10% when the two objects are normalized to be roughly geometrically identical.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground. Always use supporting surface.

Gusset: As used in this disclosure, a gusset is an angled structural member used to form a portion of the load path of section of a framework. By angled is meant that the gusset is neither parallel nor perpendicular to the force of gravity.

Force of Gravity: As used in this disclosure, the force of gravity refers to a vector that indicates the direction of the pull of gravity on an object at or near the surface of the earth.

Forward: As used in this disclosure, forward is term that relates a first object to a second object. When the first object is closer to the front of a vehicle, the first object is said to be forward of the second object. The term is commonly used on vessels and vehicles.

Frame: As used in this disclosure, a frame is a structure or a first sub-structure: a) to which an object or a second sub-structure attaches; and, b) which forms a portion of the load path of the object or the second sub-structure.

Framework: As used in this disclosure, a framework refers to the substructure of an object that forms the load path for the object.

Ground: As used in this disclosure, the ground is a solid supporting surface formed by the Earth. The term level ground means that the supporting surface formed by the ground is roughly perpendicular to the force of gravity. The term underground refers to an object being underneath the superior surface of the ground.

Gusset: As used in this disclosure, a gusset is an angled structural member used to form a portion of the load path of section of a framework. By angled is meant that the gusset is neither parallel nor perpendicular to the force of gravity.

Hitch: As used in this disclosure, a hitch is a fastening apparatus that attaches an unpowered vehicle, such as a trailer, to a motorized vehicle such that the motorized vehicle can tow the unpowered vehicle. The term trailer hitch is a synonym for a hitch.

Horizontal: As used in this disclosure, horizontal is a directional term that refers to a direction that is either: 1) parallel to the horizon; 2) perpendicular to the local force of gravity, or, 3) parallel to a supporting surface. In cases where the appropriate definition or definitions are not obvious, the second option should be used in interpreting the specification. Unless specifically noted in this disclosure, the horizontal direction is always perpendicular to the vertical direction.

Inferior: As used in this disclosure, the term inferior refers to a directional reference that is parallel to and in the same direction as the force of gravity when an object is positioned or used normally.

Interior: As used in this disclosure, the interior is used as a relational term that implies that an object is contained within the boundary of a structure or a space.

Lateral: As used in this disclosure, the term lateral refers to the movement of an object that is perpendicular to the primary sense of direction of an object and parallel to the horizontal plane (or perpendicular to the vertical plane). Lateral movement is always perpendicular to the anterior posterior axis. Lateral movement is often called sideways movement.

Left and Right: As used in this disclosure, the terms left and right are directional references associated with an object. The object is further defined with an anterior surface and a posterior surface. The terms left and right are standardized naming conventions for the lateral directions of the object. The terms left and right use the human body for the initial definition of the orientation. Specifically, when a human body is viewed from posterior side towards the anterior side, the left side of the human body is the lateral side of the human body that contains the heart. The right side of the human body is the lateral side of the body that contains the bulk of the liver. The left and right sides of the human body remain unchanged by changes to the direction from which the human body is viewed. The left side of any object is the same side as the left side of the human body when the object is viewed from posterior side towards the anterior side. The right side of any object is the same side as the right side of the human body when the object is viewed from posterior side towards the anterior side. The left and right sides of the object remain unchanged by changes to the direction from which the object is viewed.

Load: As used in this disclosure, the term load refers to an object upon which a force is acting or which is otherwise absorbing energy in some fashion. Examples of a load in this sense include, but are not limited to, a mass that is being moved a distance or an electrical circuit element that draws energy. The term load is also commonly used to refer to the forces that are applied to a stationary structure.

Load Path: As used in this disclosure, a load path refers to a chain of one or more structures that transfers a load generated by a raised structure or object to a foundation, supporting surface, or the earth.

Negative Space: As used in this disclosure, negative space is a method of defining an object through the use of open or empty space as the definition of the object itself, or, through the use of open or empty space to describe the boundaries of an object.

One to One: When used in this disclosure, a one to one relationship means that a first element selected from a first set is in some manner connected to only one element of a second set. A one to one correspondence means that the one to one relationship exists both from the first set to the second set and from the second set to the first set. A one to one fashion means that the one to one relationship exists in only one direction.

Openwork: As used in this disclosure, the term openwork is used to describe a structure, often a surface, which is formed with one or more openings that allow for visibility and fluid flow through the structure. Wrought work and meshes are forms of openwork.

Pan: As used in this disclosure, a pan is a hollow and prism-shaped containment structure. The pan has a single open face. The open face of the pan is often, but not always, the superior face of the pan. The open face is a surface selected from the group consisting of: a) a congruent end of the prism structure that forms the pan; and, b) a lateral face of the prism structure that forms the pan. A semi-enclosed pan refers to a pan wherein the closed end of prism structure of the pan and/or a portion of the closed lateral faces of the pan are open.

Pedestal: As used in this disclosure, a pedestal is an intermediary load bearing structure that forms a load path between two objects or structures.

Perimeter: As used in this disclosure, a perimeter is one or more curved or straight lines that bounds an enclosed area on a plane or surface. The perimeter of a circle is commonly referred to as a circumference.

Pickup Truck: As used in this disclosure, a pickup truck is a vehicle having an enclosed cab and an open body comprising low sides and a tailgate that is powered by an internal combustion engine. A pickup truck is further defined with a bed, a tailgate, a left sidewall, a right sidewall, and an end wall. The pickup truck bed forms the horizontal surface that supports any cargo that is carried by the pickup truck.

Platform: As used in this disclosure, a platform is an elevated horizontal surface that forms a load path to support objects placed on the superior surface of the platform.

Primary Shape: As used in this disclosure, the primary shape refers to a description of the rough overall geometric shape of an object that is assembled from multiple components or surfaces. Use Roughly Primary Structure: As used in this disclosure, a primary structure refers to the component of an object that the other components attach to. The primary structure is also called the base structure.

Prism: As used in this disclosure, a prism is a three-dimensional geometric structure wherein: 1) the form factor of two faces of the prism are congruent; and, 2) the two congruent faces are parallel to each other. The two congruent faces are also commonly referred to as the ends of the prism. The surfaces that connect the two congruent faces are called the lateral faces. In this disclosure, when further description is required a prism will be named for the geometric or descriptive name of the form factor of the two congruent faces. If the form factor of the two corresponding faces has no clearly established or well-known geometric or descriptive name, the term irregular prism will be used. The center axis of a prism is defined as a line that joins the center point of the first congruent face of the prism to the center point of the second corresponding congruent face of the prism. The center axis of a prism is otherwise analogous to the center axis of a cylinder. A prism wherein the ends are circles is commonly referred to as a cylinder.

Posterior: As used in this disclosure, posterior is a term that is used to refer to the side of an object that is distal or in the opposite direction of the anterior side. When comparing two items, the posterior item is the item that is distal from the anterior of the object.

Primary Sense of Direction: As used in this disclosure, the primary sense of direction of an object refers to a vector that: 1) passes through the center of the object; and, 2) is parallel to the direction of travel when the anterior surface(s) of the object are leading the object into the direction of travel. This definition intends to align with what people would normally call the forward direction of an object.

Ramp: As used in this disclosure, a ramp is an inclined surface that joins two parallel surfaces that are: 1) of different elevations; or 2) not aligned on the same plane.

Reach: As used in this disclosure, reach refers to a span of distance between any two objects.

Rigid Structure: As used in this disclosure, a rigid structure is a solid structure formed from an inelastic material that resists changes in shape. A rigid structure will permanently deform as it fails under a force. See bimodal flexible structure.

Square Tubing: As used in this disclosure, square tubing is a square prism-shaped structure. The square tubing forms a hollow tubular structure. The square tubing is a metal structure that is commonly used for structural purposes. The term punched square tubing refers to a square tubing with a plurality of diametrically opposed aperture pairs formed through the lateral faces of the prism structure of the square tubing. The punched square tubing is often referred to as a perforated square tubing.

Stanchion: As used in this disclosure, a stanchion refers to a vertically oriented prism-shaped pole, post, or support.

Superior: As used in this disclosure, the term superior refers to a directional reference that is parallel to and in the opposite direction of the force of gravity when an object is positioned or used normally.

Supporting Surface: As used in this disclosure, a supporting surface is a horizontal surface upon which an object is placed and to which the load of the object is transferred. This disclosure assumes that an object placed on the supporting surface is in an orientation that is appropriate for the normal or anticipated use of the object.

Tube: As used in this disclosure, the term tube is used to describe a hollow prism-shaped device with two congruent open ends. While tubes that are suitable for use in this disclosure are often used to transport or conveys fluids or gases, the purpose of the tubes in this disclosure are structural. In this disclosure, the terms inner dimension and outer dimension of a tube are used as they would be used by those skilled in the plumbing arts.

Vehicle: As used in this disclosure, a vehicle is a device that is used for transporting passengers, goods, or equipment. The term motorized vehicle specifically refers to a vehicle can move under power provided by an electric motor or an internal combustion engine. The term vehicle generically applies to motorized vehicles and vehicles without a motor. A motorized vehicle further comprises an electrical system that can be used as a source of electric energy. The enclosed passenger space of a vehicle is known as a cab.

Vertical: As used in this disclosure, vertical refers to a direction that is either: 1) perpendicular to the horizontal direction; 2) parallel to the local force of gravity; or, 3) when referring to an individual object the direction from the designated top of the individual object to the designated bottom of the individual object. In cases where the appropriate definition or definitions are not obvious, the second option should be used in interpreting the specification. Unless specifically noted in this disclosure, the vertical direction is always perpendicular to the horizontal direction.

Wall: As used in this disclosure, a wall is a vertical surface that forms a boundary or barrier of a room or chamber.

With respect to the above description, it is to be realized that the optimum dimensional relationship for the various components of the invention described above and in FIGS. 1 through 11 include variations in size, materials, shape, form, function, and manner of operation, assembly and use, are deemed readily apparent and obvious to one skilled in the art, and all equivalent relationships to those illustrated in the drawings and described in the specification are intended to be encompassed by the invention.

It shall be noted that those skilled in the art will readily recognize numerous adaptations and modifications which can be made to the various embodiments of the present invention which will result in an improved invention, yet all of which will fall within the spirit and scope of the present invention as defined in the following claims. Accordingly, the invention is to be limited only by the scope of the following claims and their equivalents.

The inventor claims:

1. A truck bed ramp comprising a receiver structure, a plurality of wheel ramps, and a pickup truck;

wherein an openwork platform structure, the receiver structure, and the plurality of wheel ramps are contained in the pickup truck;

wherein the truck bed ramp is configured for use in transporting a vehicle;

wherein the receiver structure attaches to the openwork platform structure;

wherein the plurality of wheel ramps attach to the openwork platform structure;

wherein the pickup truck further comprises a hitch;

wherein the openwork platform structure rests on a superior surface of the bed of the pickup truck;

wherein the receiver structure secures the openwork platform structure to the hitch of the pickup truck;

wherein the plurality of wheel ramps are configured for loading the vehicle into the bed of the pickup truck;

wherein the openwork platform structure is configured for elevating the vehicle above the bed of the pickup truck;

wherein the receiver structure is configured for receiving the openwork platform structure into a fixed position relative to the bed of the pickup truck;

wherein the openwork platform structure comprises a superior face, an inferior face, a plurality of lateral faces, a left side ramp channel, and a right side ramp channel;

wherein the superior face forms the supporting surface that is configured for elevating the vehicle above the bed of the pickup truck;

wherein the inferior face is configured for receiving the loads of the superior face and the vehicle from the plurality of lateral faces;

wherein the inferior face forms a pedestal that is configured for transferring the loads of the vehicle and the openwork platform structure to the bed of the pickup truck.

2. The truck bed ramp according to claim 1 wherein the openwork platform structure is a load bearing structure.

3. The truck bed ramp according to claim 2 wherein the receiver structure removably attaches to the openwork platform structure;

wherein the receiver structure removably attaches the openwork platform structure to the hitch of the pickup truck;

wherein the receiver structure forms a brace structure that distributes transient forces between the openwork platform structure and the pickup truck.

4. The truck bed ramp according to claim 3 wherein each selected wheel ramp is a load bearing structure;

wherein any first wheel ramp selected from the plurality of wheel ramps is essentially geometrically identical to any second wheel ramp selected from the plurality of wheel ramps;

wherein the ramps formed by the plurality of wheel ramps allows the vehicle to be rolled from the ground onto the superior face of the openwork platform structure.

5. The truck bed ramp according to claim 4 wherein the superior face is a congruent end of the openwork platform structure;

wherein the superior face forms the superior surface of the openwork platform structure;

wherein the superior face is a load bearing structure;

wherein the superior face is configured for receiving the load of the vehicle;

wherein the superior face transfers the load of the vehicle to the plurality of lateral faces;

wherein the inferior face is a congruent end of the openwork platform structure;

wherein the inferior face forms the inferior surface of the openwork platform structure;

wherein the inferior face is a load bearing structure;

wherein the inferior face is the face of the openwork platform structure that is distal from the superior face;

wherein the inferior face forms the congruent end of the openwork platform structure that rests on the superior surface of the bed of the pickup truck;

wherein the plurality of lateral faces form the lateral face structure of the openwork platform structure;

wherein the plurality of lateral faces form the vertically oriented load bearing structures of the openwork platform structure;

wherein the plurality of lateral faces is configured to transfer the loads of the superior face and the vehicle to the inferior face;

wherein the plurality of lateral faces form the extension structure that is configured to elevate the superior face above the bed of the pickup truck;

wherein the plurality of lateral faces comprises an anterior lateral face, and a posterior lateral face;

wherein the anterior lateral face is a lateral face selected from the plurality of lateral faces of the openwork platform structure;

wherein the surface of the anterior lateral face is perpendicular to a primary sense of direction of the pickup truck;

wherein the anterior lateral face is the lateral face of the openwork platform structure that is proximal to the front of the pickup truck;

wherein the posterior lateral face is a lateral face selected from the plurality of lateral faces of the openwork platform structure;

wherein the surface of the posterior lateral face is perpendicular to the primary sense of direction of the pickup truck;

wherein the posterior lateral face is the lateral face of the openwork platform structure that is proximal to the rear of the pickup truck;

wherein the posterior lateral face is the face of the openwork platform structure that is distal from the anterior lateral face;

wherein the left side ramp channel comprises a first plurality of aligned negative spaces that are formed through the anterior lateral face and the posterior lateral face of the openwork platform structure;

wherein the left side ramp channel forms a channel that is configured for receiving a wheel ramp selected from the plurality of wheel ramps;

wherein the right side ramp channel comprises a second plurality of aligned negative spaces that are formed through the anterior lateral face and the posterior lateral face of the openwork platform structure;

wherein the right side ramp channel forms a channel that is configured for receiving a wheel ramp selected from the plurality of wheel ramps.

6. The truck bed ramp according to claim 5 wherein the receiver structure comprises a receiver stanchion, a receiver mount, and a plurality of receiver braces;

wherein the receiver mount attaches to the receiver stanchion;

wherein the plurality of receiver braces attach to the receiver stanchion.

7. The truck bed ramp according to claim 6 wherein the receiver stanchion is a load bearing structure;

wherein the receiver stanchion is a vertically oriented structure;

wherein the receiver stanchion forms an extension structure that bridges the reach between the inferior face of the openwork platform structure and the hitch of the pickup truck;

wherein the receiver stanchion forms a bracing structure that distributes transient forces between the inferior face and the receiver mount.

8. The truck bed ramp according to claim 7 wherein the receiver mount is a mechanical structure;

wherein the receiver mount attaches to the congruent end of the receiver stanchion that is distal from the inferior face of the openwork platform structure;

wherein the receiver mount removably attaches to the hitch of the pickup truck;

wherein the receiver mount secures the receiver stanchion to the hitch.

9. The truck bed ramp according to claim 8 wherein each receiver brace selected from the plurality of receiver braces forms a load bearing gusset;

wherein each receiver brace selected from the plurality of receiver braces attaches the receiver stanchion to the inferior face of the openwork platform structure;

wherein the plurality of receiver braces combine to form a bracing structure that distributes transient forces between the receiver stanchion and the inferior face of the openwork platform structure.

10. The truck bed ramp according to claim 9 wherein the plurality of wheel ramps comprises a left side wheel ramp and a right side wheel ramp;

wherein the left side wheel ramp is a load bearing structure;

wherein the left side wheel ramp forms a ramp;

wherein the right side wheel ramp is a load bearing structure;

wherein the right side wheel ramp forms a ramp.

* * * * *